(12) United States Patent
Awa et al.

(10) Patent No.: US 10,047,986 B2
(45) Date of Patent: Aug. 14, 2018

(54) DECOMPRESSION DEVICE

(71) Applicant: DENSO CORPORATION, Kariya, Aichi-pref. (JP)

(72) Inventors: Ryoko Awa, Obu (JP); Etsuhisa Yamada, Kariya (JP); Haruyuki Nishijima, Obu (JP); Yoshiaki Takano, Kosai (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 130 days.

(21) Appl. No.: 14/408,874

(22) PCT Filed: May 21, 2013

(86) PCT No.: PCT/JP2013/003218
§ 371 (c)(1),
(2) Date: Dec. 17, 2014

(87) PCT Pub. No.: WO2013/190768
PCT Pub. Date: Dec. 27, 2013

(65) Prior Publication Data
US 2015/0276285 A1 Oct. 1, 2015

(30) Foreign Application Priority Data
Jun. 22, 2012 (JP) .................. 2012-140773

(51) Int. Cl.
*F25B 41/06* (2006.01)

(52) U.S. Cl.
CPC ............ *F25B 41/062* (2013.01); *F25B 41/06* (2013.01); *F25B 2341/0653* (2013.01);
(Continued)

(58) Field of Classification Search
CPC .............. F25B 41/062; F25B 41/06; F25B 2341/0653; F25B 2341/0683; F25B 2500/13; F25B 2500/12; Y02B 30/72
(Continued)

(56) References Cited

U.S. PATENT DOCUMENTS 2,694,296 A * 11/1954 Prosek .................... F25B 41/06
138/44
3,023,591 A * 3/1962 Tilney ................... F25B 41/062
137/501

(Continued)

FOREIGN PATENT DOCUMENTS

JP  H0282074 A  3/1990
JP  H05026540 A  2/1993
(Continued)

OTHER PUBLICATIONS

International Search Report and Written Opinion (in Japanese with English Translation) for PCT/JP2013/003218, dated Aug. 20, 2013; ISA/JP.
(Continued)

*Primary Examiner* — Grant Moubry
*Assistant Examiner* — Kirstin Oswald
(74) *Attorney, Agent, or Firm* — Harness, Dickey & Pierce, P.L.C.

(57) ABSTRACT

A body part of a decompression device is provided with a swirling space that allows a refrigerant from a refrigerant inlet to swirl, a throttle space that depressurizes the refrigerant that has flowed out of the swirling space, and a downstream-side space that is disposed on the downstream side of the throttle space in a refrigerant flow and is formed so that the pressure of a refrigerant present in the downstream-side space becomes uniform.

24 Claims, 8 Drawing Sheets

(52) U.S. Cl.
CPC ... *F25B 2341/0683* (2013.01); *F25B 2500/12* (2013.01); *F25B 2500/13* (2013.01); *Y02B 30/72* (2013.01)

(58) Field of Classification Search
USPC .................................................. 62/498, 528
See application file for complete search history.

(56) References Cited

U.S. PATENT DOCUMENTS

| | | | | |
|---|---|---|---|---|
| 3,111,816 | A * | 11/1963 | Tilney | F25B 41/062 236/92 B |
| 3,640,086 | A * | 2/1972 | Brody | F24F 5/001 62/210 |
| 3,818,981 | A * | 6/1974 | Caldwell | G05D 23/128 137/625.5 |
| 3,919,991 | A * | 11/1975 | Neschke | F01L 13/08 123/182.1 |
| 4,236,669 | A * | 12/1980 | Kountz | F25B 41/062 236/92 B |
| 4,618,092 | A * | 10/1986 | Fukushima | B60H 1/3205 236/92 B |
| 5,005,370 | A * | 4/1991 | Tanaka | F25B 41/062 62/211 |
| 5,238,219 | A * | 8/1993 | Noelke | F25B 41/062 251/122 |
| 5,243,829 | A * | 9/1993 | Bessler | B60H 1/3225 62/126 |
| 5,515,695 | A * | 5/1996 | Sakakibara | F25B 41/062 236/92 B |
| 5,555,739 | A * | 9/1996 | Kujirai | B60H 1/00571 62/225 |
| 5,619,861 | A * | 4/1997 | Yamanaka | F25B 41/062 62/225 |
| 6,266,971 | B1 * | 7/2001 | Schroder | B60H 1/00485 62/292 |
| 6,904,769 | B2 * | 6/2005 | Ogata | F04F 5/04 417/187 |
| 2003/0079493 | A1 * | 5/2003 | Hirota | F25B 41/062 62/474 |
| 2004/0089019 | A1 * | 5/2004 | Kawamura | F04F 5/04 62/500 |
| 2008/0282717 | A1 * | 11/2008 | Yukimoto | F16K 47/04 62/225 |
| 2009/0183520 | A1 * | 7/2009 | Yukimoto | F25B 41/062 62/222 |
| 2014/0020424 | A1 | 1/2014 | Suzuki et al. | |

FOREIGN PATENT DOCUMENTS

| | | |
|---|---|---|
| JP | H08159617 A | 6/1996 |
| JP | 2003106710 A | 4/2003 |
| JP | 2007032980 A | 2/2007 |
| JP | 2008309345 A | 12/2008 |
| JP | 4775363 B2 | 9/2011 |
| WO | WO-2012132317 A1 | 10/2012 |
| WO | WO-2013190769 A1 | 12/2013 |

OTHER PUBLICATIONS

Office Action dated Sep. 1, 2015 in corresponding Japanese Application No. 2012-140773 with English Translation.
Office Action dated Apr. 28, 2015 in corresponding Japanese Application No. 2012-140773.
Office Action dated Sep. 25, 2015 in corresponding Chinese Application No. 201380032578.9 (with English translation).

* cited by examiner

DECOMPRESSION DEVICE

CROSS REFERENCE TO RELATED APPLICATIONS

This application is a U.S. National Phase Application under 35 U.S.C. 371 of International Application No. PCT/JP2013/003218 filed on May 21, 2013 and published in Japanese as WO 2013/190768 A1 on Dec. 27, 2013. This application is based on and claims the benefit of priority from Japanese Patent Application No. 2012-140773 filed on Jun. 22, 2012. The entire disclosures of all of the above applications are incorporated herein by reference.

TECHNICAL FIELD

The present disclosure relates to a decompression device that is applied to a vapor compression refrigeration cycle.

BACKGROUND ART

In the past, Patent Document 1 disclosed a decompression device in which an ejector is connected to a refrigerant outlet of a temperature type expansion valve, as a decompression device that is applied to a vapor compression refrigeration cycle.

In the decompression device disclosed in Patent Document 1, the pressure recovery of a refrigerant, which has been depressurization-boiled in a throttle passage of the temperature type expansion valve, is performed at an inlet of a nozzle portion of the ejector to generate boiling nuclei in the refrigerant flowing into the nozzle portion. Accordingly, the boiling of the refrigerant at the nozzle portion is facilitated, so that the reduction of nozzle efficiency is limited. Meanwhile, nozzle efficiency is energy conversion efficiency when the pressure energy of a refrigerant at the nozzle portion is converted into kinetic energy.

PRIOR ART DOCUMENT

Patent Document

Patent Document 1: Japanese Patent No. 4775363

SUMMARY OF THE INVENTION

However, according to the examination of the inventor of the present application, in the decompression device of Patent Document 1, liquid phase refrigerant having been condensed in a heat radiator flows into the throttle passage of the temperature type expansion valve as it is. For this reason, there is a concern that boiling delay of the refrigerant that has flowed into the throttle passage may occur. Meanwhile, boiling delay means a phenomenon in which the refrigerant does not instantly start to be boiled at the smallest passage area portion most reduced in a refrigerant passage sectional area and starts to be boiled on the rear side (downstream side) of the smallest passage area portion after the refrigerant flows into the throttle passage.

When boiling delay occurs, the size of a droplet (a drop of liquid phase refrigerant) is not reduced and a shock wave generated at the time of the start of the boiling of the refrigerant is not easily attenuated. For this reason, a refrigerant may cause noise to be generated in a refrigeration cycle. Further, when boiling delay occurs, the size of a droplet is larger than the size of a droplet, which is obtained when boiling delay does not occur, and biasing occurs. For this reason, there is a concern that noise may also be generated due to a collision between a droplet and the wall surface of the refrigerant passage.

The disclosure has been made in consideration of the above description, and an object of the invention is to reduce causes of noise generation of a decompression device that is applied to a vapor compression refrigeration cycle.

According to an aspect of the present disclosure, a decompression device is used for a vapor compression refrigeration cycle and depressurizes a refrigerant. The decompression device includes a body part and a valve body. The body part includes at least one refrigerant inlet through which the refrigerant flows into the body part, a refrigerant outlet through which the refrigerant flows out of the body part, a swirling space or swirling chamber in which the refrigerant flowing from the refrigerant inlet swirls, and a refrigerant passage space that guides the refrigerant flowing out of the swirling space or swirling chamber to the refrigerant outlet. The valve body varies a passage sectional area of the refrigerant passage space. The refrigerant passage space includes a smallest passage area portion that is smallest in passage sectional area, a throttle space that is positioned on at least a part of an outer peripheral surface of the valve body and is a space in which the refrigerant flowing out of the swirling space or swirling chamber is depressurized, and a downstream-side space that is positioned on a downstream side of the throttle space in a refrigerant flow direction. The valve body varies the passage sectional area of the smallest passage area portion, and the downstream-side space has a shape to make the pressure of the refrigerant uniform in the downstream-side space during the operation of the refrigeration cycle.

According to this, since the refrigerant that has flowed in from the refrigerant inlet is allowed to swirl in the swirling space, the pressure of the refrigerant, which is present on the center axis side in the swirling space, can be lowered to a pressure at which a liquid phase refrigerant is saturated or a pressure at which the refrigerant is depressurization-boiled (cavitation occurs).

Accordingly, since the refrigerant having immediately flowed into the throttle space can be depressurization-boiled, the boiling delay of the refrigerant in the throttle space can be limited. That is, causes of noise generation, which is caused by the occurrence of the boiling delay of the refrigerant, can be reduced. Further, since the refrigerant, which has flowed into the throttle space, can be made to stably start to be boiled in the vicinity of the smallest passage area portion, the variation of the flow rate of the refrigerant flowing out of the decompression device can also be limited.

Furthermore, since the downstream-side space, which has a shape in which the pressure of the refrigerant becomes uniform, is provided on the downstream side of the throttle space, a shock wave generated due to boiling can be attenuated in the downstream-side space. Accordingly, the generation of noise in the refrigeration cycle caused by the propagation of a shock wave, which is generated due to depressurization, to the downstream of the decompression device can be limited.

Therefore, the causes of noise generation of the decompression device as a whole can be reduced by the reduction of both the cause of noise generation that is caused by the boiling delay of the refrigerant that has flowed into the throttle space and the cause of noise generation that is caused by a shock wave generated due to depressurization.

Meanwhile, "the pressure of a refrigerant becomes uniform" of this claim does not only mean that the pressure of a refrigerant present in the downstream-side space is completely the same at any position, and includes that pressure is slightly distributed so that the generation of noise in the downstream-side space can be limited.

Further, a shape in which the outer peripheral shape of the downstream-side space is a cylindrical shape or a truncated conical shape having a refrigerant passage sectional area gradually increasing toward the downstream side in the refrigerant flow can be employed as a specific shape of the downstream-side space in which the pressure of the refrigerant inside becomes uniform.

EMBODIMENTS FOR EXPLOITATION OF THE INVENTION

Figure 1:
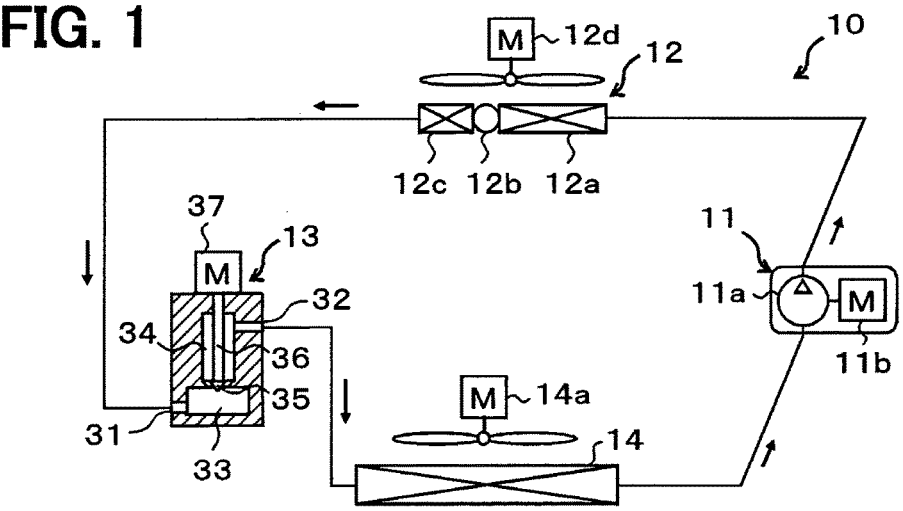
FIG. 1 is a schematic diagram of a refrigeration cycle of a first embodiment of the present disclosure.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 2:
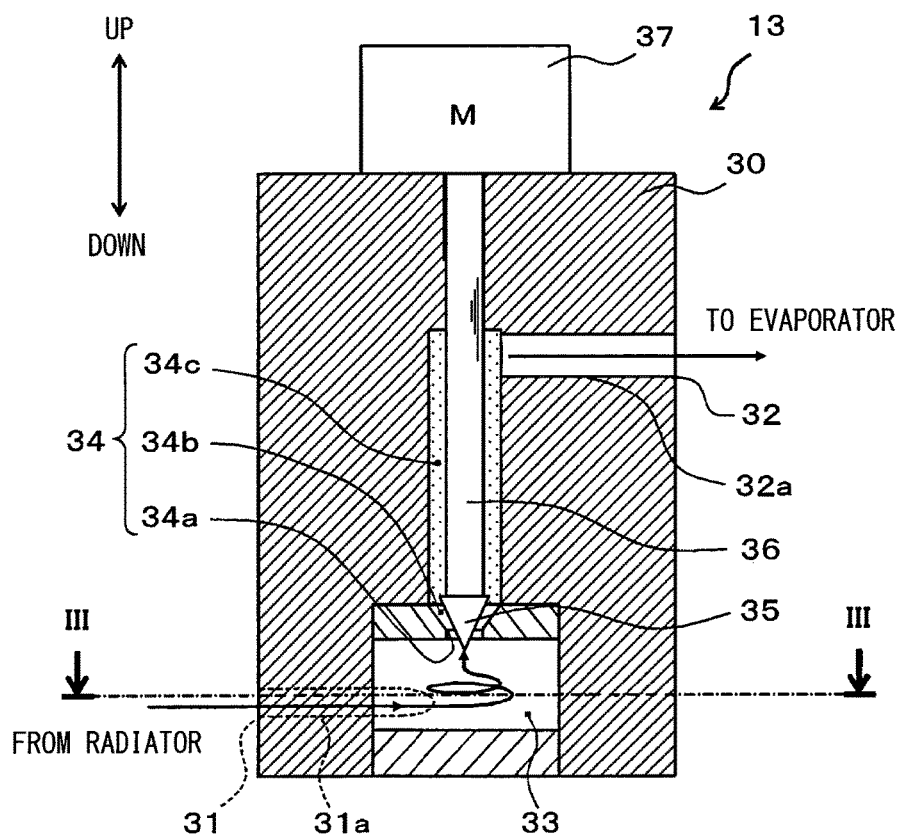
FIG. 2 is a schematic cross-sectional diagram of a decompression device, parallel to an axial direction thereof, according to the first embodiment.
Figure 3:
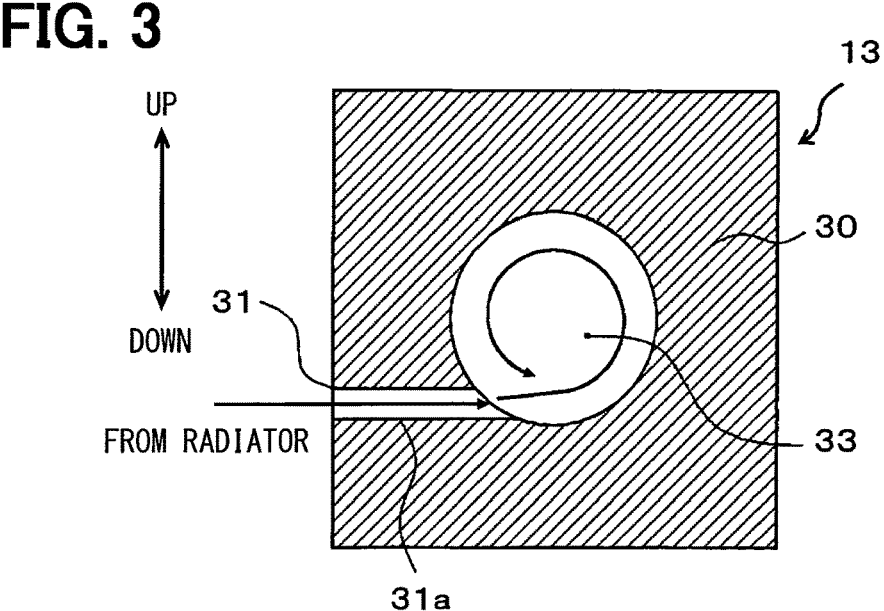
FIG. 3 is a cross-sectional diagram taken along a line III-III of FIG. 2.

A first embodiment of the present disclosure will be described with reference to FIGS. 1 to 3. A decompression device 13 of this embodiment is applied to a vapor compression refrigeration cycle 10 as shown in FIG. 1. Moreover, the refrigeration cycle 10 is applied to a vehicle air conditioning system, and cools air blown into a vehicle interior that is an air-conditioning target space.

First, in the refrigeration cycle 10, a compressor 11 sucks a refrigerant, raises pressure until the refrigerant becomes a high-pressure refrigerant, and discharges the refrigerant. Specifically, the compressor 11 of this embodiment is an electric compressor in which a fixed-capacity compression mechanism 11a and an electric motor 11b for driving the compression mechanism 11a are accommodated in a single housing.

Various compression mechanisms, such as a scroll-type compression mechanism and a vane-type compression mechanism, can be employed as the compression mechanism 11a. Further, the operation (rotation speed) of the electric motor 11b is controlled by a control signal that is output from a control device to be described below, and any one of an AC motor and a DC motor may be employed as the electric motor 11b.

A refrigerant inlet side of a condensing part 12a of a heat radiator 12 is connected to a discharge port of the compressor 11. The heat radiator 12 is a heat exchanger for heat radiation that cools a high-pressure refrigerant, which is discharged from the compressor 11, through the radiation of heat by exchanging heat between the high-pressure refrigerant and vehicle exterior air (outside air) that is blown by a cooling fan 12d.

More specifically, the heat radiator 12 is a so-called subcooling condenser including: the condensing part 12a that condenses a high-pressure gas-phase refrigerant, which is discharged from the compressor 11, by exchanging heat between the high-pressure gas-phase refrigerant and the outside air, which is blown from the cooling fan 12d, to radiate the heat of the high-pressure gas-phase refrigerant; a receiver part 12b that separates gas and liquid of the refrigerant flowing out of the condensing part 12a and stores a surplus liquid phase refrigerant; and a subcooling part 12c that subcools a liquid phase refrigerant flowing out of the receiver part 12b by exchanging heat between the liquid phase refrigerant and the outside air blown from the cooling fan 12d.

Meanwhile, the refrigeration cycle 10 of this embodiment employs an HFC based refrigerant (specifically, R134a) as the refrigerant, and forms a subcritical refrigeration cycle in which the pressure of a high-pressure side refrigerant does not exceed a critical pressure of the refrigerant. An HFO based refrigerant (specifically, R1234yf) or the like may be employed as the refrigerant forming the subcritical refrigeration cycle.

Further, a refrigerant oil for lubricating the compressor 11 is mixed with the refrigerant, and a part of the refrigerant oil is circulated in the cycle together with the refrigerant. The cooling fan 12d is an electric blower of which the rotation speed (the amount of blown air) is controlled by a control voltage output from the control device. A refrigerant inlet 31 of the decompression device 13 is connected to a refrigerant outlet side of the subcooling part 12c of the heat radiator 12.

The decompression device 13 is depressurizing means for depressurizing a high-pressure liquid phase refrigerant, which has flowed out of the heat radiator 12 and been subcooled, and making the depressurized refrigerant flow out to the downstream side. A specific configuration of the decompression device 13 will be described with reference to FIGS. 2 and 3. Meanwhile, up and down arrows in FIG. 2 indicate, respectively, up and down directions in a state where the refrigeration cycle 10 is mounted on a vehicle air conditioning system. This is also the same in the following drawings.

The decompression device 13 includes a body part 30 that is formed by the combination of a plurality of components. The refrigerant inlet 31 through which the refrigerant that has flowed out of the heat radiator 12 flows into the body part, a refrigerant outlet 32 through which the refrigerant flows out of the body part, a swirling space or swirling chamber 33 in which the refrigerant from the refrigerant inlet 31 swirls, a refrigerant passage space 34 that guides the refrigerant that has flowed out of the swirling space or swirling chamber 33 to the refrigerant outlet 32, and the like are formed in the body part 30 of this embodiment.

First, the swirling space or swirling chamber 33 is formed in a rotating body shape. The rotating body shape is a solid shape formed by rotating a plane figure around one straight line (center axis) coplanar with the plane figure. More specifically, the swirling space or swirling chamber 33 of this embodiment is formed in a substantially cylindrical shape. The swirling space or swirling chamber 33 may be formed in a shape in which a circular cone or a circular truncated cone is combined with a cylinder, or the like.

The refrigerant inlet 31 is connected to the swirling space 33 through a refrigerant inflow passage 31a. As shown in FIG. 3, the refrigerant inflow passage 31a extends in a tangential direction of an inner wall surface of the swirling space 33 when viewed in a center axis direction of the swirling space 33. Accordingly, the refrigerant, which has flowed into the swirling space 33 from the refrigerant inlet 31 through the refrigerant inflow passage 31a, flows along the inner wall surface of the swirling space 33 and swirls in the swirling space 33 as shown by a solid arrow of FIG. 3.

Meanwhile, the refrigerant inflow passage 31a does not need to be formed to completely match the tangential direction of the swirling space 33 when viewed in the center axis direction of the swirling space 33. If the refrigerant inflow passage 31a includes at least a component in the tangential direction of the swirling space 33, the refrigerant inflow passage 31a may be formed to include components in the other directions (for example, components in the axial direction of the swirling space 33).

Here, since a centrifugal force acts on the refrigerant swirling in the swirling space 33, the pressure of a refrigerant present on the center axis side becomes lower than the pressure of a refrigerant present on the outer peripheral side in the swirling space 33. Accordingly, in this embodiment, during the normal operation of the refrigeration cycle 10, the pressure of the refrigerant present on the center axis side in the swirling space 33 is lowered to a pressure at which a liquid phase refrigerant is saturated or a pressure at which a refrigerant is depressurization-boiled (cavitation occurs).

The adjustment of the pressure of the refrigerant present on the center axis side in the swirling space 33 can be performed by adjusting the swirling flow rate of the refrigerant swirling in the swirling space 33. Further, the swirling flow rate can be adjusted by, for example, adjusting an area ratio between the passage sectional area of the refrigerant inflow passage 31a and the sectional area of the swirling space 33 perpendicular to the axial direction. Meanwhile, the swirling flow rate in this embodiment means the flow rate of the refrigerant in the swirling direction in the vicinity of the outermost peripheral portion of the swirling space 33.

Next, the refrigerant passage space 34 is formed in a rotating body shape, similar to the swirling space 33. The center axis of the refrigerant passage space 34 is disposed coaxially with the center axis of the swirling space 33. More specifically, the refrigerant passage space 34 of this embodiment is formed in a shape in which a circular truncated cone of which the sectional area gradually increases toward the downstream side in the refrigerant flow (the upper side in a vertical direction) is combined with a cylinder of which an end face having the largest sectional area of the circular truncated cone extends toward the downstream side in the refrigerant flow.

Accordingly, the smallest passage area portion 34a, which is most reduced in a refrigerant passage sectional area, is formed at the most upstream portion of the refrigerant passage space 34 of this embodiment in the refrigerant flow (a lower portion in the vertical direction). Further, the refrigerant present on the center axis side of the swirling space 33 flows into the refrigerant passage space 34 from the smallest passage area portion 34a. Furthermore, the refrigerant outlet 32 is connected to the most downstream portion of the refrigerant passage space 34 in the refrigerant flow (an upper portion in the vertical direction) through a refrigerant outflow passage 32a that extends in a substantially horizontal direction.

Moreover, a valve body 35 that varies the refrigerant passage sectional area of the smallest passage area portion 34a and an actuating bar 36 that connects the valve body 35 to an electric actuator 37 formed of a stepping motor and displaces the valve body 35 are accommodated in the body part 30. Meanwhile, the operation of the electric actuator 37 is controlled by a control signal that is output from the control device.

The valve body 35 is formed in a conical shape that expands toward the downstream side in the refrigerant flow, and the center axis of the valve body 35 is disposed coaxially with the center axes of the swirling space 33 and the refrigerant passage space 34. In addition, the largest outer diameter portion of the valve body 35 is displaced on the downstream side of the smallest passage area portion 34a in the refrigerant flow. Further, a throttle space 34b, which depressurizes the refrigerant flowing out of the swirling space 33, is formed between the inner peripheral surface of a circular truncated conical portion of the refrigerant passage space 34 and the outer peripheral surface of the valve body 35.

Here, since a spread angle of the valve body 35 of this embodiment is smaller than a spread angle of the circular truncated conical portion of the refrigerant passage space 34, the refrigerant passage sectional area of the throttle space 34b gradually increases toward the downstream side in the refrigerant flow. In this embodiment, the throttle space 34b is made to function as a nozzle by the increase of the refrigerant passage sectional area, and the flow rate of a refrigerant, which is depressurized in the throttle space 34b, is increased to a speed close to a sonic speed.

The actuating bar 36 is formed in the shape of a cylinder that extends coaxially with the swirling space 33 and the refrigerant passage space 34. The valve body 35 is connected to one end side of the actuating bar 36 (a lower side in the vertical direction) by joining means such as welding, and an operating portion of the electric actuator 37 is connected to the other end side thereof (an upper side in the vertical direction).

Further, a downstream-side space 34c of which the cross-section perpendicular to the center axis direction has a doughnut shape (an annular shape obtained by removing a smaller-diameter circular shape from a circular shape disposed coaxially with the smaller-diameter circular shape) is formed between the inner peripheral surface of a cylindrical portion of the refrigerant passage space 34 and the outer peripheral surface of the actuating bar 36 on the downstream side of the throttle space 34b of the refrigerant passage space 34 in the refrigerant flow.

The downstream-side space 34c of this embodiment is formed so that the downstream-side space 34c is instantaneously filled with a high-speed refrigerant ejected from the throttle space 34b functioning as a nozzle and the pressure of a refrigerant present in the downstream-side space thus becomes substantially uniform. A refrigerant inlet side of an evaporator 14 is connected to the refrigerant outlet 32 of the decompression device 13.

The evaporator 14 is a heat exchanger for absorbing heat that evaporates a low-pressure refrigerant depressurized by the decompression device 13 and performs a heat absorbing action by exchanging heat between the low-pressure refrigerant and air that is blown into the vehicle interior from a blower fan 14a. The blower fan 14a is an electric blower of which the rotation speed (the amount of blown air) is controlled by a control voltage output from the control device. A suction side of the compressor 11 is connected to an outlet side of the evaporator 14.

Next, the control device (not shown) includes a well-known microcomputer including a CPU, a ROM and a RAM, and peripheral circuits of the microcomputer. The control device controls the operations of the above-mentioned various electric actuators 11b, 12d, 37, and 14a and the like by performing various calculations and processing on the basis of a control program stored on the ROM.

Further, a sensor group for controlling air conditioning, such as an inside air-temperature sensor for detecting the temperature of air present in the vehicle interior, an outside air-temperature sensor for detecting the temperature of outside air, a solar radiation sensor for detecting the quantity of solar radiation in the vehicle interior, an evaporator-temperature sensor for detecting the temperature of air discharged from the evaporator 14 (the temperature of the evaporator), an outlet-side temperature sensor for detecting the temperature of a refrigerant on the outlet side of the evaporator 14, and an outlet-side pressure sensor for detecting the pressure of a refrigerant present on the outlet side of the evaporator 14, is connected to the control device. Accordingly, detection values of the sensor group are input to the control device.

Furthermore, an operation panel (not shown), which is disposed near a dashboard positioned at the front portion in the vehicle interior, is connected to the input side of the control device, and operation signals output from various operation switches mounted on the operation panel are input to the control device. An air conditioning operation switch that is used to perform air conditioning in the vehicle interior, a vehicle interior temperature setting switch that is used to set the temperature of air present in the vehicle interior, a switch that is used to select an air conditioning operation mode, and the like are provided as the various operation switches that are mounted on the operation panel.

Meanwhile, the control device of this embodiment is integrated with control means for controlling the operations of various control target devices connected to the output side of the control device, and the structure (hardware and software), which controls the operations of the respective control target devices, of the control device forms the control means of the respective control target devices. For example, structure (hardware and software), which controls the operation of the electric motor 11b of the compressor 11, forms discharge capability control means in this embodiment.

Next, the operation of this embodiment having the above-mentioned configuration will be described. First, when an operation switch of the operation panel is turned on, the control device operates the electric motor 11b of the compressor 11, the cooling fan 12d, the blower fan 14a, the electric actuator 37 of the decompression device 13, and the like. Accordingly, the compressor 11 sucks and compresses a refrigerant and discharges the refrigerant.

The gas-phase refrigerant, which is discharged from the compressor 11 and has a high temperature and a high pressure, flows into the condensing part 12a of the heat radiator 12 and is condensed by exchanging heat between the air (outside air), which is blown from the cooling fan 12d, and itself and by radiating heat. The refrigerant, which has radiated heat in the condensing part 12a, is separated into gas and liquid in the receiver part 12b. A liquid phase refrigerant, which has been subjected to gas-liquid separation in the receiver part 12b, is changed into a subcooled liquid phase refrigerant by exchanging heat between the air, which is blown from the cooling fan 12d, and itself in the subcooling part 12c and further radiating heat.

The subcooled liquid phase refrigerant, which flows out of the subcooling part 12c of the heat radiator 12, is depressurized and expanded in the decompression device 13. Specifically, in the decompression device 13, a refrigerant, which has flowed in from the refrigerant inlet 31, flows into the swirling space 33 through the refrigerant inflow passage 31a. Since the refrigerant swirls in the swirling space 33, the pressure of a refrigerant present on the center axis side falls to a pressure at which a liquid phase refrigerant is saturated or a pressure at which a refrigerant is depressurization-boiled.

Further, the refrigerant, which is present on the center axis side and of which the pressure has fallen, flows into the refrigerant passage space 34 from the smallest passage area portion 34a and is depressurized in the throttle space 34b. In this case, the control device adjusts the refrigerant passage area in the smallest passage area portion 34a by controlling the operation of the electric actuator 37 so that the degree of superheating of the refrigerant on the outlet side of the evaporator 14 calculated from the temperature detected by the outlet-side temperature sensor and the pressure detected by the outlet-side pressure sensor approaches a predetermined given value.

Furthermore, since the throttle space 34b of this embodiment functions as a nozzle, a gas-liquid multiphase low-pressure refrigerant depressurized in the throttle space 34b is jetted to the downstream-side space 34c and instantaneously fills the downstream-side space 34c. Accordingly, a mist state in which droplets of the refrigerant (drops of the liquid phase refrigerant) are uniformly distributed is formed in the inner space (a region shown in FIG. 2 by dot hatching) of the downstream-side space 34c, and the pressure of a refrigerant becomes substantially uniform.

The refrigerant that has flowed into the downstream-side space 34c flows out of the refrigerant outlet 32 through the refrigerant outflow passage 32a. The low-pressure refrigerant that has flowed out of the refrigerant outlet 32 flows into the evaporator 14, is heated by air that is blown by the blower fan 14a, and is evaporated. Accordingly, the air blown into the vehicle interior is cooled. The gas-phase refrigerant that has flowed out of the evaporator 14 is sucked into the compressor 11 and is compressed again.

Since the refrigeration cycle 10 of this embodiment operates as described above, the refrigeration cycle 10 can cool the air, which is blown into the vehicle interior from the blower fan 14a, by making the evaporator 14 perform a heat absorbing action. In addition, the causes of noise generation, which is caused by the flow of a refrigerant in the decompression device 13, can be effectively reduced in the decompression device 13 of this embodiment.

The reduction of the causes of noise generation will be described in detail. In the decompression device 13 of this embodiment, the refrigerant that has flowed in from the refrigerant inlet 31 is allowed to swirl in the swirling space 33. Accordingly, the pressure of a refrigerant present on the center axis side in the swirling space 33 is lowered to a pressure at which a liquid phase refrigerant is saturated or a pressure at which a refrigerant is depressurization-boiled. In addition, since the swirling space 33 and the refrigerant passage space 34 are disposed coaxially with each other, the refrigerant, which is present on the center axis side in the swirling space 33 and of which the pressure has fallen, can be made to flow into the throttle space 34b.

In other words, a gas-liquid multiphase refrigerant, which is present on the center axis side and includes more saturated liquid phase refrigerant starting to be boiled by a slight pressure drop or more gas-phase refrigerant formed by depressurization-boiling than the outer peripheral side of the swirling space 33, can be made to flow into the throttle space 34b. Accordingly, since the refrigerant can be depressurization-boiled immediately after flowing into the throttle space 34b, the boiling delay of the refrigerant in the throttle space 34b can be limited. That is, the causes of noise generation, which is caused by the occurrence of the boiling delay of the refrigerant, can be reduced.

Further, in the downstream-side space 34c placed on the downstream side of the throttle space 34b, a refrigerant is in a mist state and the pressure of the refrigerant becomes substantially uniform. Accordingly, a shock wave, which is generated by the depressurization of the refrigerant, can be attenuated in the downstream-side space 34c. Therefore, the causes of noise generation in the refrigeration cycle 10, which is caused by the propagation of a shock wave to the downstream of the decompression device, can be reduced. As a result, according to the decompression device 13 of this embodiment, both the cause of noise generation of a refrigerant, which has flowed into the throttle space 34b, and the cause of noise generation of a refrigerant, which has flowed out of the throttle space 34b, are limited. Accordingly, the cause of noise generation, which is caused by the flow of a refrigerant in the decompression device 13, can be effectively reduced.

Moreover, in the decompression device 13 of this embodiment, a space in which the actuating bar 36 formed in a cylindrical shape is coaxially disposed and of which the outer peripheral side is formed in a cylindrical shape and the cross-section perpendicular to the center axis direction has a doughnut shape is employed as the downstream-side space 34c. Accordingly, since a refrigerant is not present in the vicinity of a center axis portion where the pressure of a refrigerant is likely to fall by a swirling flow, it is easy to uniformize the pressure of a refrigerant in the downstream-side space 34c.

Further, in the decompression device 13 of this embodiment, the largest outer diameter portion of the valve body 35 is disposed on the downstream side of the smallest passage area portion 34a in the refrigerant flow. Accordingly, even though the valve body 35 is displaced, the flow of the refrigerant, which swirls in the swirling space 33, is hardly affected. This is effective in easily adjusting the swirling speed of the refrigerant that swirls in the swirling space 33.

Second Embodiment

Figure 4:
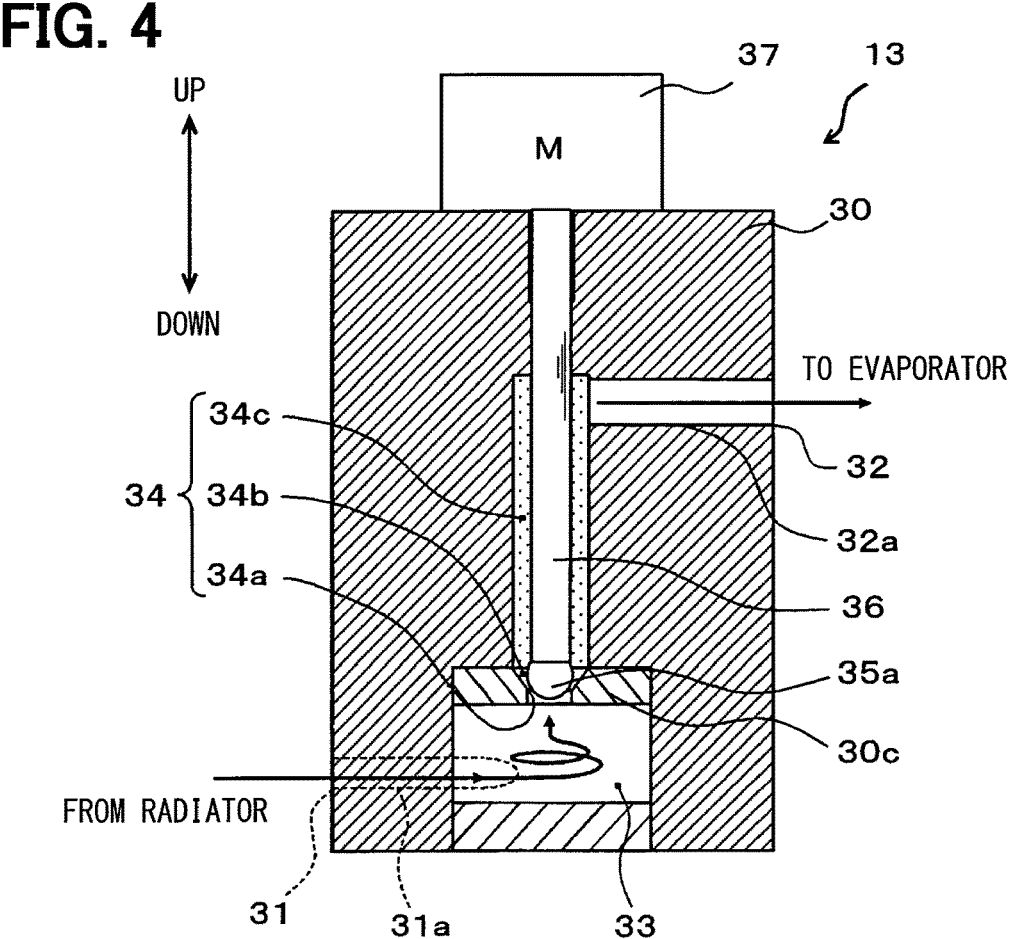
FIG. 4 is a schematic cross-sectional diagram of a decompression device, parallel to an axial direction thereof, according to a second embodiment of the present disclosure.

An example in which the valve body 35 formed in a conical shape is employed as a valve body of the decompression device 13 has been described in the first embodiment, but a valve body 35a formed in a spherical shape as shown in FIG. 4 is employed in this embodiment. Meanwhile, the same portions as the portions of the first embodiment or portions equivalent to the portions of the first embodiment are denoted by the same reference numerals in FIG. 4. This is also the same in the following drawings.

Further, a cylindrical space (straight portion) and a circular truncated conical space (tapered portion), which continues from the cylindrical space and is increased in diameter in a refrigerant flow direction, are formed in a passage formation member 30c that forms the most upstream portion of a refrigerant passage space 34 disposed on the outer peripheral side of the valve body 35a. Further, in this embodiment, the smallest passage area portion 34a is formed at a connection portion between the straight portion and the tapered portion as shown in FIG. 4.

Even though this spherical valve body 35a is employed, a throttle space 34b of which a refrigerant passage sectional area gradually increases toward the downstream side in the refrigerant flow can be formed on at least a part of an inner peripheral surface of the tapered portion of the passage formation member 30c and an outer peripheral surface of the valve body 35a, and the throttle space 34b can be made to function as a nozzle. Other structures and operations are the same as those of the first embodiment.

Figure 5:
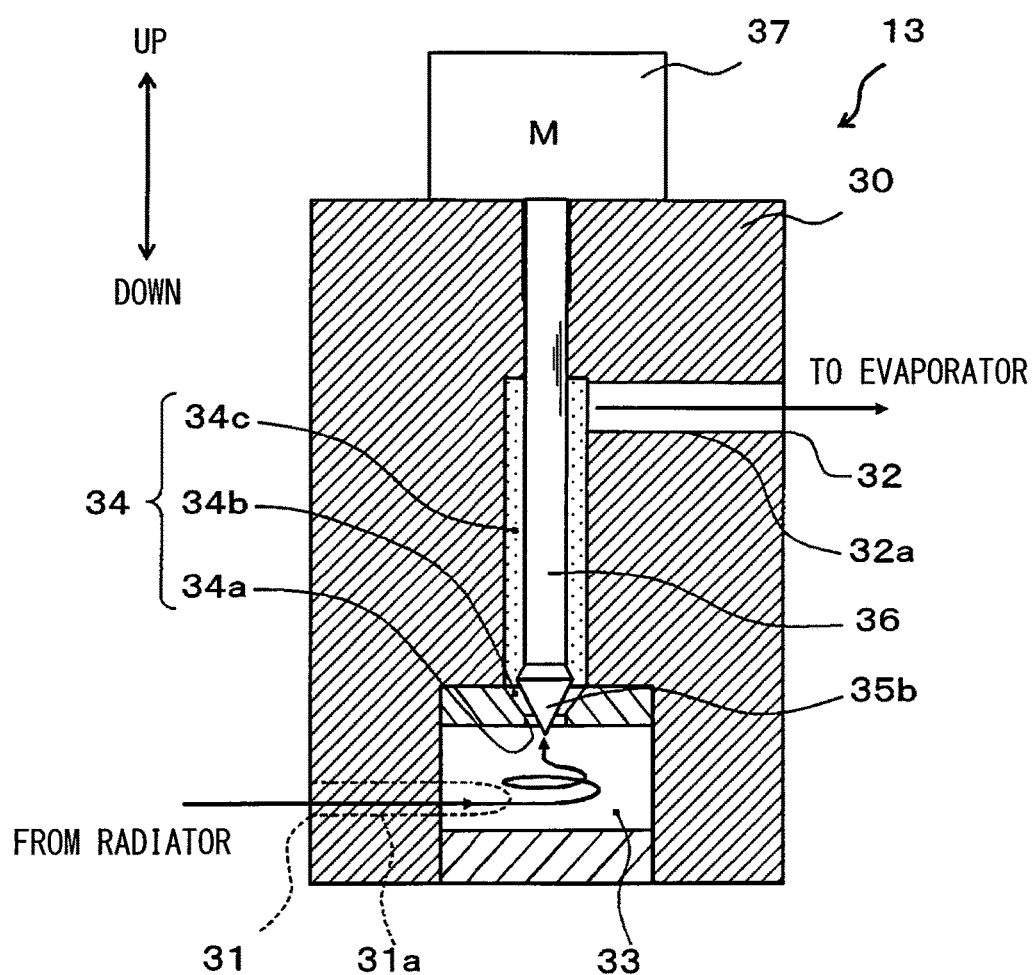
FIG. 5 is a schematic cross-sectional diagram of a decompression device, parallel to an axial direction thereof, according to a modification of the second embodiment.

Accordingly, the same advantages as those in the first embodiment can be obtained even in the decompression device 13 of this embodiment. Moreover, the shape of the valve body of the decompression device 13 is not limited to a conical shape and a spherical shape, and may be a shape in which a throttle space 34b of which a refrigerant passage sectional area gradually increases toward the downstream side in the refrigerant flow can be formed on at least a part of an inner peripheral surface of the refrigerant passage space 34 and an outer peripheral surface of the valve body. For example, a valve body 35b having a shape, which is obtained from the combination of a conical shape and a circular truncated conical shape (a shape in which a cross-section taken along the center axis direction has a polygonal shape), and the like can be employed as shown in FIG. 5.

Third Embodiment

Figure 6:
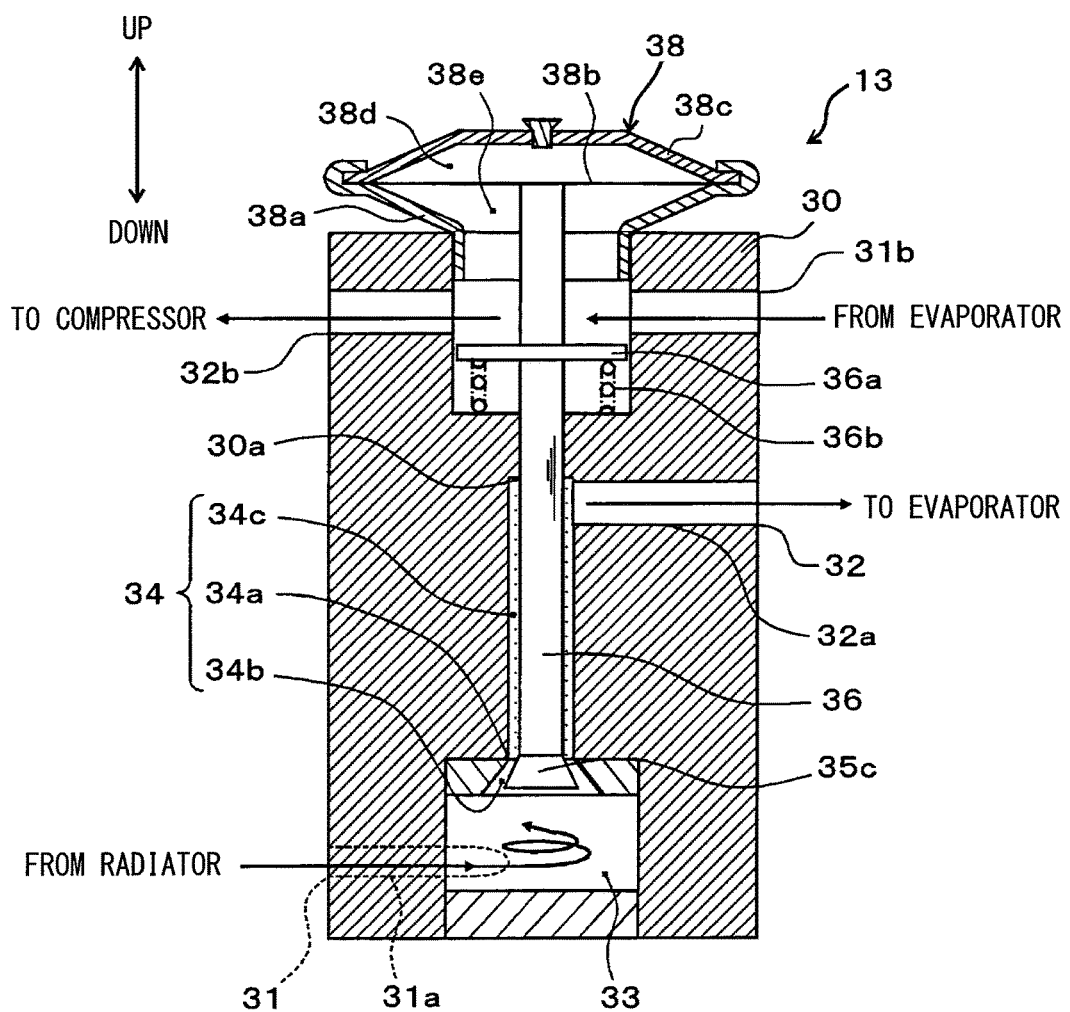
FIG. 6 is a schematic cross-sectional diagram of a decompression device, parallel to an axial direction thereof, according to a third embodiment of the present disclosure.

The decompression device 13, which electrically displaces the actuating bar 36 and the valve body 35 by the electric actuator 37, has been described in the first embodiment, but an example in which the actuating bar 36 and a valve body 35c are mechanically displaced by a diaphragm 38b as a pressure responsive member will be described in this embodiment. More specifically, a decompression device 13 of this embodiment is formed of a so-called uniform internal pressure-temperature type expansion valve as shown in a cross-sectional view of FIG. 6.

First, a second refrigerant inflow passage 31b through which a low-pressure refrigerant that has flowed out of the evaporator 14 flows into the body part, and a second refrigerant outflow passage 32b through which a refrigerant that has flowed out of the second refrigerant inflow passage 31b and flowing out of the evaporator 14 flows into the suction side of the compressor 11 are formed in a body part 30 of this embodiment in addition to the refrigerant inlet 31 and the refrigerant outlet 32, and the like that have been described above.

Moreover, an element unit 38, which displaces the actuating bar 36 according to the temperature and pressure of the refrigerant flowing out of the evaporator 14 and flowing in a refrigerant passage reaching the second refrigerant outflow passage 32b from the second refrigerant inflow passage 31b, is mounted on the body part 30 of this embodiment.

The element unit 38 includes an element housing 38a that is mounted on the body part 30 by fixing means such as screwing, the diaphragm 38b that is a pressure responsive member formed of a disc-shaped metal sheet, an element cover 38c that forms an outer shell of the element unit 38 together with the element housing 38a while an outer edge portion of the diaphragm 38b is interposed between the element cover 38c and the element housing 38a, and the like.

The element housing 38a and the element cover 38c are made of metal such as stainless steel (SUS304) and are formed in the shape of a cup. While an outer peripheral edge portion of the diaphragm 38b is interposed between the element housing 38a and the element cover 38c, outer peripheral end portions of the element housing 38a and the element cover 38c are integrally joined to each other by joining means, such as welding or soldering. Accordingly, an inner space of the element unit 38, which is formed by the element housing 38a and the element cover 38c, is partitioned by the diaphragm 38b into two spaces.

The space, which is formed by the element cover 38c and the diaphragm 38b, of the two spaces forms a sealed space 38d in which a temperature sensitive medium changing in pressure according to the temperature of the refrigerant flowing out of the evaporator 14 is enclosed. The temperature sensitive medium, which has the same composition as that of a refrigerant circulating in the refrigeration cycle 10, is enclosed in the sealed space 38d so as to have a predetermined density. Accordingly, the temperature sensitive medium of this embodiment is R134a.

On the other hand, the space, which is formed by the element housing 38a and the diaphragm 38b, forms an introduction space 38e which communicates with the refrigerant passage reaching the second refrigerant outflow passage 32b from the second refrigerant inflow passage 31b and into which the refrigerant flowing out of the evaporator 14 is introduced. Therefore, the temperature of the refrigerant, which flows out of the evaporator 14 and is introduced into the introduction space 38e, is transmitted to the temperature sensitive medium enclosed in the sealed space 38d through the diaphragm 38b.

As a result, an internal pressure of the sealed space 38d becomes a pressure corresponding to the temperature of the refrigerant flowing out of the evaporator 14. Further, the diaphragm 38b is deformed according to a differential pressure between the internal pressure of the sealed space 38d and the pressure of the refrigerant that has flowed out of the evaporator 14 and flowed into the introduction space 38e. For that reason, it is preferable that the diaphragm 38b be made of a material, which is rich in elasticity, excellent in heat conduction, and tough. For example, the diaphragm 38b is formed of a metal sheet made of stainless steel (SUS304) or the like.

In addition, the other end portion of the actuating bar 36 (an upper end portion in the vertical direction) is joined to a central portion of the diaphragm 38b by joining means such as welding, and the valve body 35c is connected to one end portion of the actuating bar 36 (a lower end portion in the vertical direction) by joining means such as welding. Accordingly, the actuating bar 36 and the valve body 35c are displaced in accordance with the deformation of the diaphragm 38b in this embodiment, so that the refrigerant passage area of the smallest passage area portion 34a is adjusted.

Further, the valve body 35c is formed in a circular truncated conical shape that tapers toward the downstream side in the refrigerant flow, and a portion of the refrigerant passage space 34 positioned on the outer peripheral side of the valve body 35c is also formed in a circular truncated conical shape that tapers toward the downstream side in the refrigerant flow. Accordingly, in this embodiment, the smallest passage area portion 34a is formed at the most downstream portion of the circular truncated conical portion of the refrigerant passage space 34 in the refrigerant flow and the largest outer diameter portion of the valve body 35c is displaced on the upstream side of the smallest passage area portion 34a in the refrigerant flow.

Furthermore, when the valve body 35c is displaced toward the upstream side in the refrigerant flow (the lower side in the vertical direction), the refrigerant passage area of the smallest passage area portion 34a increases. When the valve body 35c is displaced toward the downstream side in the refrigerant flow (the upper side in the vertical direction), the refrigerant passage area of the smallest passage area portion 34a is reduced. Meanwhile, since the spread angle of the valve body 35c is smaller than the spread angle of the circular truncated conical portion of the refrigerant passage space 34, the refrigerant passage area of the throttle space 34b of this embodiment is also gradually reduced toward the downstream side in the refrigerant flow.

Further, the actuating bar 36 of this embodiment is provided with a flange part 36a that receives a load of a coil spring 36b accommodated in the body part 30. The flange part 36a is a disc-shaped member that expands in the radial direction of the actuating bar 36, and the coil spring 36b applies a load, which biases the flange part 36a to a side in which the valve body 35c reduces the refrigerant passage area of the smallest passage area portion 34a, to the flange part 36a.

Other structures are the same as those of the first embodiment. Meanwhile, the actuating bar 36 is disposed in a through hole 30a that passes through the downstream-side space 34c formed in the body part 30 and the introduction space 38e. However, since a gap between the through hole 30a and the actuating bar 36 is sealed by a seal member such as an O-ring (not shown), a refrigerant does not leak from the gap between the through hole 30a and the actuating bar 36 even though the actuating bar 36 is displaced.

Next, the operation of this embodiment having the above-mentioned configuration will be described. When the degree of superheating of the refrigerant, which has flowed out of the evaporator 14 and flowed into the introduction space 38e from the second refrigerant inflow passage 31b, rises in the decompression device 13 of this embodiment, the saturated pressure of the temperature sensitive medium enclosed in the sealed space 38d rises and a differential pressure between the internal pressure of the sealed space 38d and the pressure of the introduction space 38e increases. Accordingly, the diaphragm 38b displaces the valve body 35c in a direction where the refrigerant passage area of the smallest passage area portion 34a is increased (toward the lower side in the vertical direction).

On the contrary, when the degree of superheating of the refrigerant flowing out of the evaporator 14 falls, the saturated pressure of the temperature sensitive medium enclosed in the sealed space 38d falls and a differential pressure between the internal pressure of the sealed space 38d and the pressure of the introduction space 38e is reduced. Accordingly, the diaphragm 38b displaces the valve body 35c in a direction where the refrigerant passage area of the smallest passage area portion 34a is reduced (toward the upper side in the vertical direction).

Since the element unit 38 (specifically, the diaphragm 38b) displaces the valve body 35c according to the degree of superheating of the refrigerant flowing out of the evaporator 14 as described above, the refrigerant passage area of the smallest passage area portion 34a is adjusted so that the degree of superheating of the refrigerant present on the outlet side of the evaporator 14 approaches a predetermined given value. Meanwhile, with the adjustment of a load that is applied to the flange part 36a from the coil spring 36b, the valve opening pressure of the valve body 35c can be changed to change a target degree of superheating.

Other operations of the refrigeration cycle 10 are the same as those of the first embodiment. Accordingly, air, which is blown into the vehicle interior from the blower fan 14a, can be cooled even in this embodiment as in the first embodiment. Further, the causes of noise generation, which is caused by the flow of a refrigerant in the decompression device 13, can be effectively reduced even in the decompression device 13 of this embodiment as in the first embodiment.

Fourth Embodiment

Figure 7:
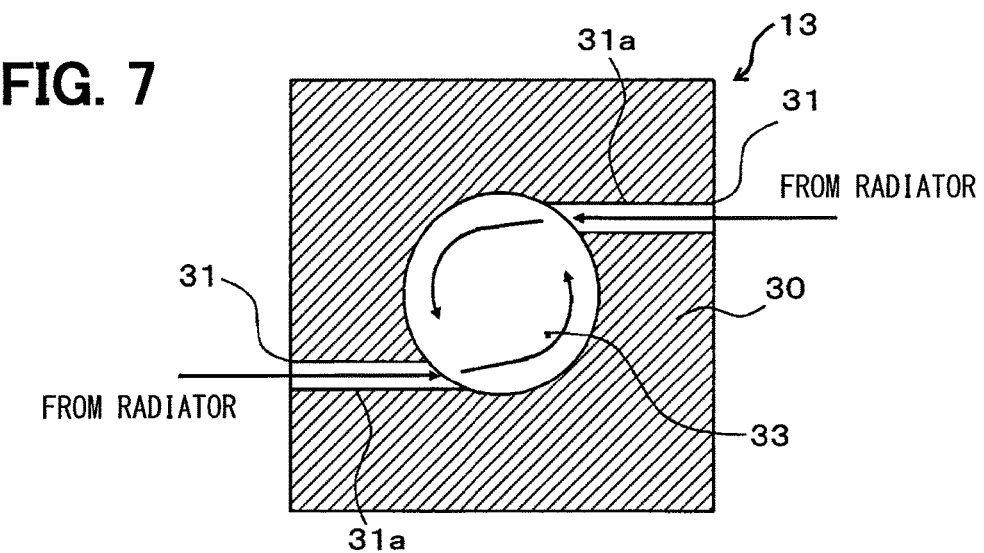
FIG. 7 is a cross-sectional diagram of a decompression device, corresponding to FIG. 3, according to a fourth embodiment of the present disclosure.

In this embodiment, the aspect of the disposition of a refrigerant inlet 31 is changed relative to the first embodiment. Specifically, as shown in FIG. 7, a plurality of (specifically, two) refrigerant inlets 31 and a plurality of (specifically, two) refrigerant inflow passages 31a of this embodiment are provided and the respective refrigerant inlets 31 and the respective refrigerant inflow passages 31a are disposed symmetrically with respect to the center axis of the swirling space 33. Other structures and operations are the same as those of the first embodiment.

Since the refrigerant inlets 31 and the refrigerant inflow passages 31a are disposed symmetrically with respect to the center axis of the swirling space 33 as described above, a swirling flow can be further reliably generated in the swirling space 33. Accordingly, the boiling delay of the refrigerant in the throttle space 34b can be limited. Therefore, according to the decompression device 13 of this embodiment, the causes of noise generation, which is caused by the occurrence of the boiling delay of a refrigerant, can be further reliably reduced and the variation of the flow rate of a refrigerant flowing out of the decompression device 13 can be further reliably limited.

Meanwhile, an example in which two refrigerant inlets 31 and two refrigerant inflow passages 31a are provided is shown in FIG. 7, but three or more refrigerant inlets 31 and three or more refrigerant inflow passages 31a may be provided.

Fifth Embodiment

Figure 8:
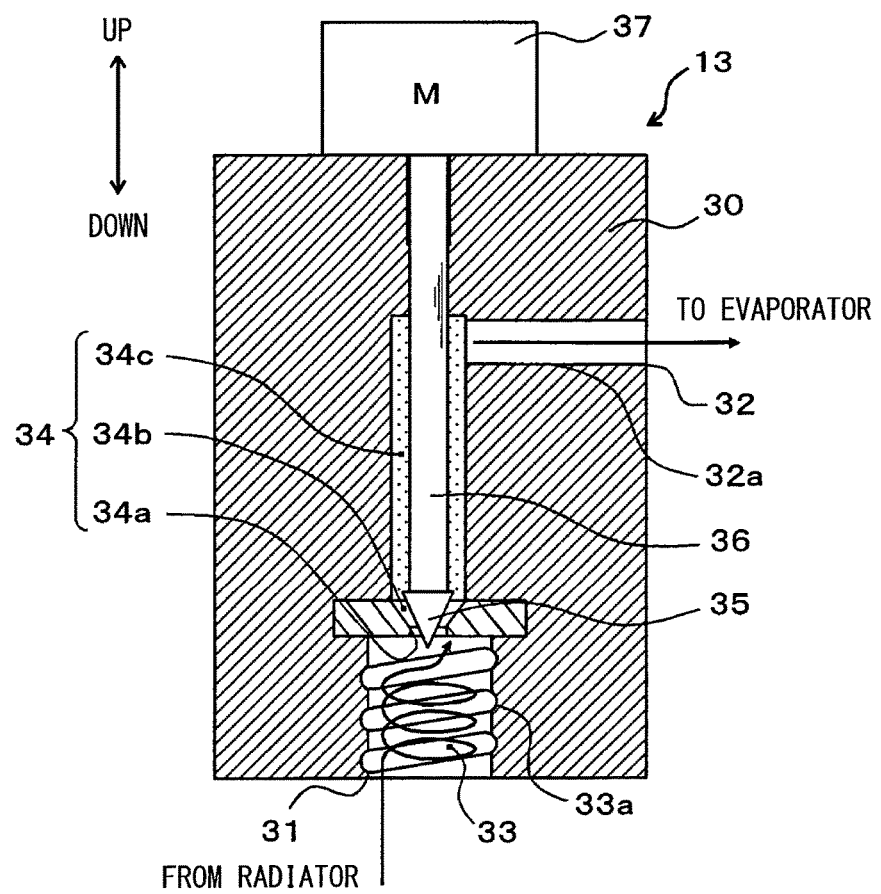
FIG. 8 is a schematic cross-sectional diagram of a decompression device, parallel to an axial direction thereof, according to a fifth embodiment of the present disclosure.

In this embodiment, the aspect of the disposition of a refrigerant inlet 31, which is formed in a body part 30 of a decompression device 13, is changed relative to the first embodiment. Specifically, as shown in FIG. 8, the refrigerant inlet 31 of this embodiment is disposed at a lower portion of the body part 30 in the vertical direction and a spiral groove 33a is formed on the inner peripheral wall surface of a swirling space 33 of this embodiment.

Even though the groove 33a is formed, a refrigerant can be allowed to swirl in the swirling space 33. Other structures and operations are the same as those of the first embodiment. Accordingly, the same advantages as those in the first embodiment can be obtained even in this embodiment.

Sixth Embodiment

Figure 9:
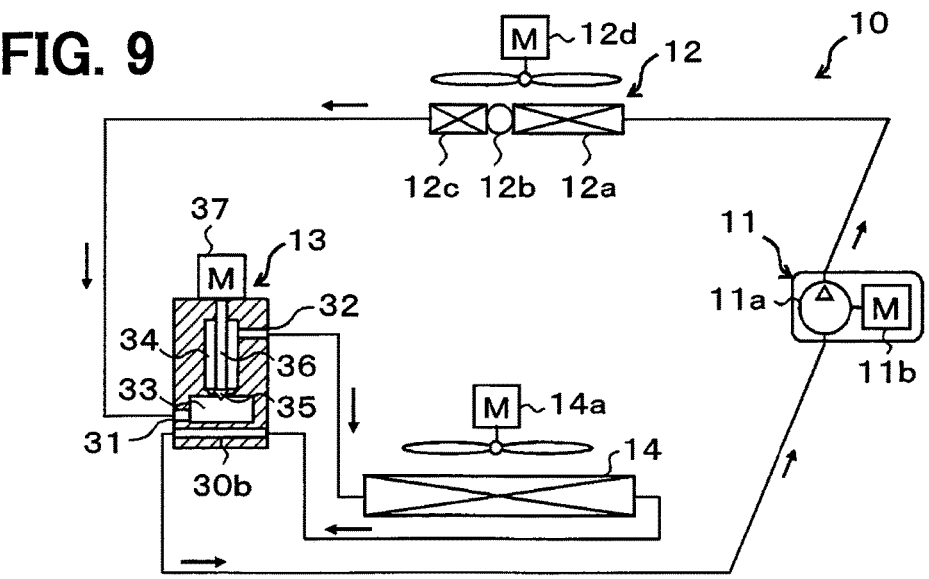
FIG. 9 is a schematic diagram of a refrigeration cycle of a sixth embodiment of the present disclosure.
Figure 10:
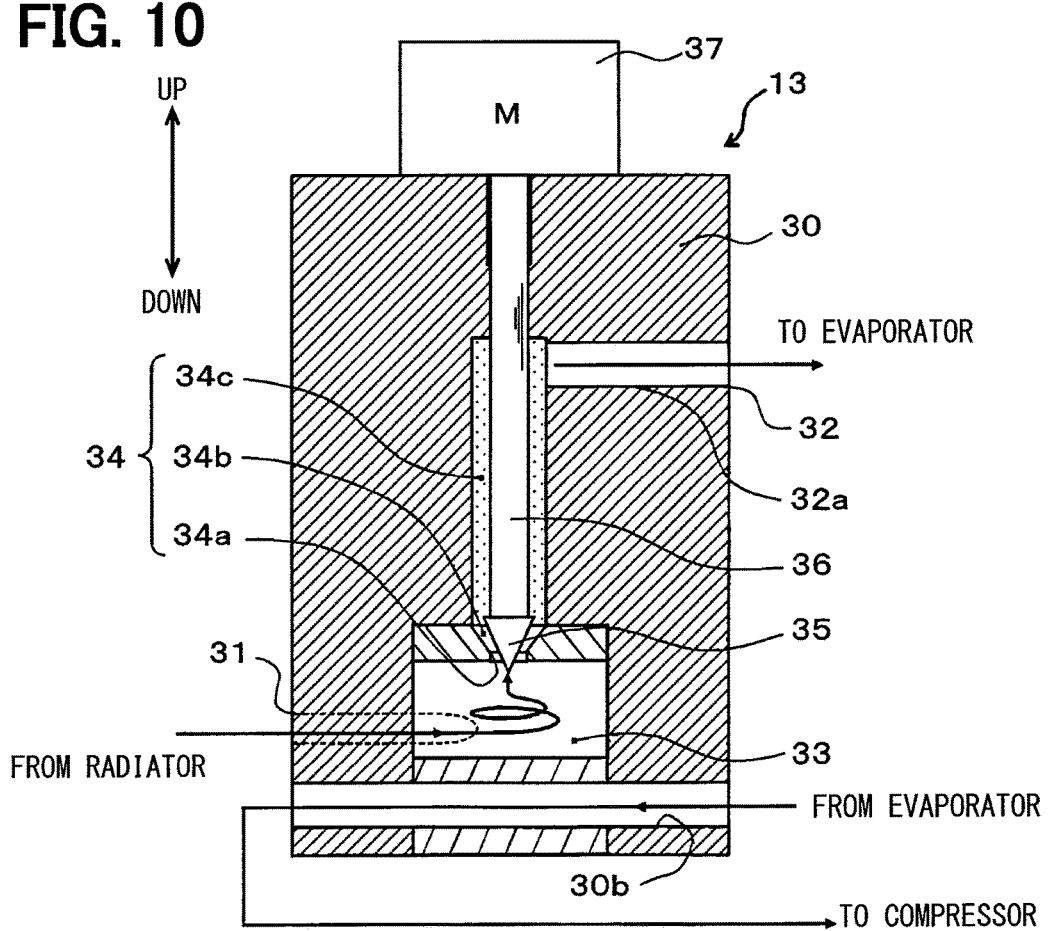
FIG. 10 is a schematic cross-sectional diagram of a decompression device, parallel to an axial direction thereof, according to the sixth embodiment.

In a decompression device 13 of this embodiment, as shown in FIGS. 9 and 10, a refrigerant passage 30b which is formed in the body part 30 and through which a low-pressure refrigerant that has flowed out of the evaporator 14 flows to the suction side of the compressor 11 is added to the first embodiment. The refrigerant passage 30b is disposed to pass in the vicinity of the swirling space 33 (the lower side in this embodiment) so that heat can be exchanged between the low-pressure refrigerant flowing in the refrigerant passage 30b and a high-pressure refrigerant swirling in the swirling space 33.

Other structures and operations are the same as those of the first embodiment. Accordingly, the causes of noise generation, which is caused by the flow of a refrigerant in the decompression device 13, can be effectively reduced even in the decompression device 13 of this embodiment as in the first embodiment.

Further, the decompression device 13 of this embodiment can cool the high-pressure refrigerant, which swirls in the swirling space 33, by exchanging heat between the high-pressure refrigerant and the low-pressure refrigerant that flows in the refrigerant passage 30b. Accordingly, the refrigeration capacity of the evaporator 14 can be increased by the lowering of the enthalpy of a refrigerant that flows into the evaporator 14.

Seventh Embodiment

Figure 11:
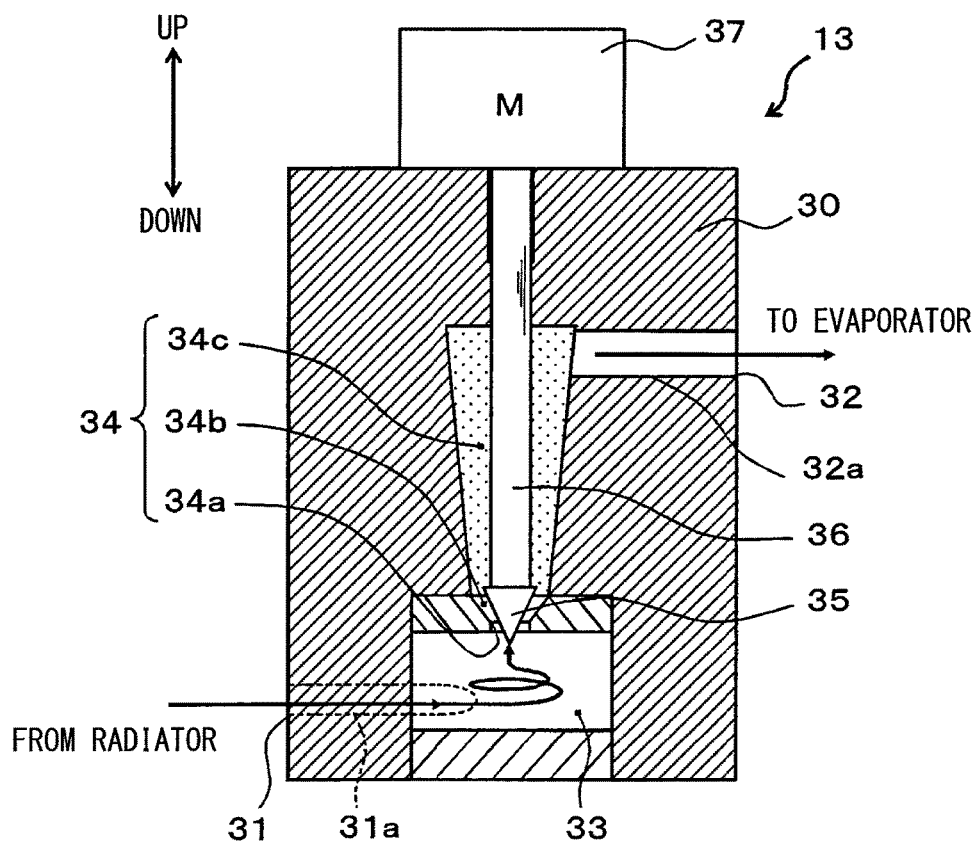
FIG. 11 is a schematic cross-sectional diagram of a decompression device, parallel to an axial direction thereof, according to a seventh embodiment of the present disclosure.

An example in which the refrigerant passage space 34 is formed in a rotating body shape formed by the combination of a circular truncated cone and a cylinder has been described in the first embodiment. However, in this embodiment, a refrigerant passage space 34 is formed in a rotating body shape formed by the combination of two circular truncated cones having different spread angles as shown in FIG. 11. Accordingly, the cross-section of a downstream-side space 34c of this embodiment perpendicular to the center axis direction has a doughnut shape, and the cross-sectional area of the downstream-side space 34c having a doughnut shape gradually increases toward the downstream side in the refrigerant flow.

Other structures and operations are the same as those of the first embodiment. Accordingly, the causes of noise generation, which is caused by the flow of a refrigerant in the decompression device 13, can be effectively reduced even in the decompression device 13 of this embodiment as in the first embodiment.

Eighth Embodiment

Figure 12:
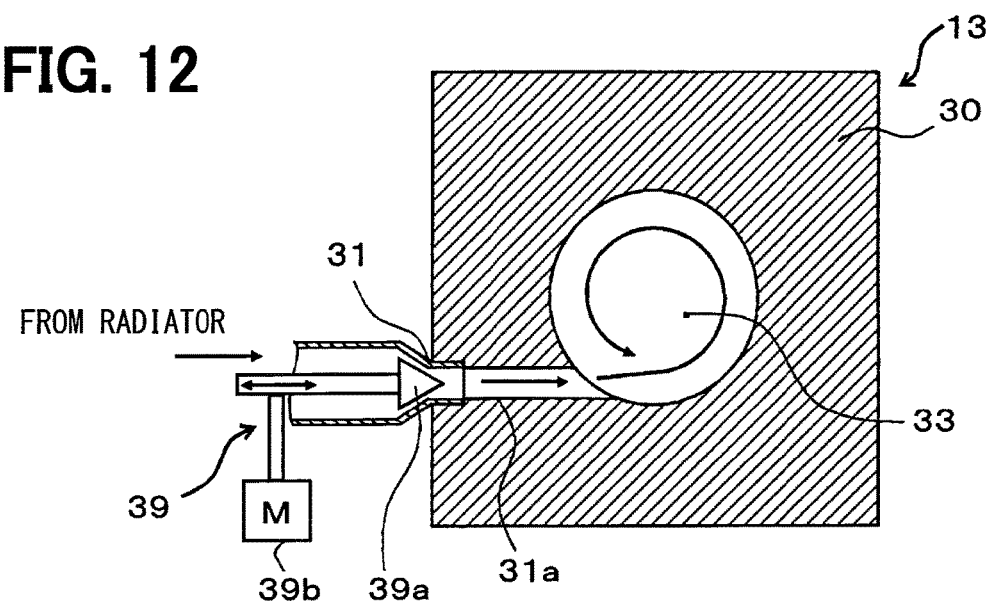
FIG. 12 is a cross-sectional diagram of a decompression device, corresponding to FIG. 3, according to an eighth embodiment of the present disclosure.

In this embodiment, an inflow refrigerant-flow rate adjusting valve 39 as an example of a swirling-flow-rate adjusting device, which adjusts the swirling flow rate of a refrigerant swirling in the swirling space 33, is added to the decompression device 13 of the first embodiment as shown in FIG. 12.

The inflow refrigerant-flow rate adjusting valve 39 changes the swirling flow rate of a refrigerant, which is present in the swirling space 33, by changing the flow rate of a refrigerant, which flows into the swirling space 33 from the refrigerant inlet 31, through the change of the refrigerant passage area of the refrigerant inlet 31. Specifically, the inflow refrigerant-flow rate adjusting valve 39 includes a valve body 39a that adjusts the opening of the refrigerant inlet 31 and an electric actuator 39b that displaces the valve body 39a.

Further, in this embodiment, the control device detects the temperature, the pressure, and the like of a refrigerant flowing out of the heat radiator 12 and calculates the degree of subcooling of the refrigerant from the detection values of the temperature, the pressure, and the like. Furthermore, the operation of the electric actuator 39b is controlled with reference to a control map, which is stored in a storage circuit of the control device in advance, on the basis of the calculated degree of subcooling so that the pressure of a refrigerant present on the center axis side in the swirling space 33 becomes a pressure at which a liquid phase refrigerant is saturated or a pressure at which a refrigerant is depressurization-boiled.

Other structures and operations are the same as those of the first embodiment. Accordingly, the causes of noise generation, which is caused by the flow of a refrigerant in the decompression device 13, can be effectively reduced even in the decompression device 13 of this embodiment as in the first embodiment.

Further, since the flow rate of a refrigerant flowing into the swirling space 33 from the refrigerant inlet 31 is adjusted by the inflow refrigerant-flow rate adjusting valve 39 in this embodiment, the pressure of a refrigerant, which is present on the center axis side in the swirling space 33, can be further reliably lowered to a pressure at which a liquid phase refrigerant is saturated or a pressure at which a refrigerant is depressurization-boiled. As a result, the causes of noise generation, which is caused by the occurrence of the boiling delay of a refrigerant in the throttle space 34b, can be further reliably reduced.

Other Embodiments

This disclosure is not limited to the above-mentioned embodiments, and may have various modifications as described below without departing from the gist of this disclosure.

(1) Examples in which a shape formed by the combination of a cylinder and a circular truncated cone and a shape formed by the combination of two circular truncated cones having different spread angles are employed as the rotating body shape of the refrigerant passage space 34 have been described in the above-mentioned respective embodiments, but the rotating body shape of the refrigerant passage space 34 is not limited to these shapes.

Figure 13:
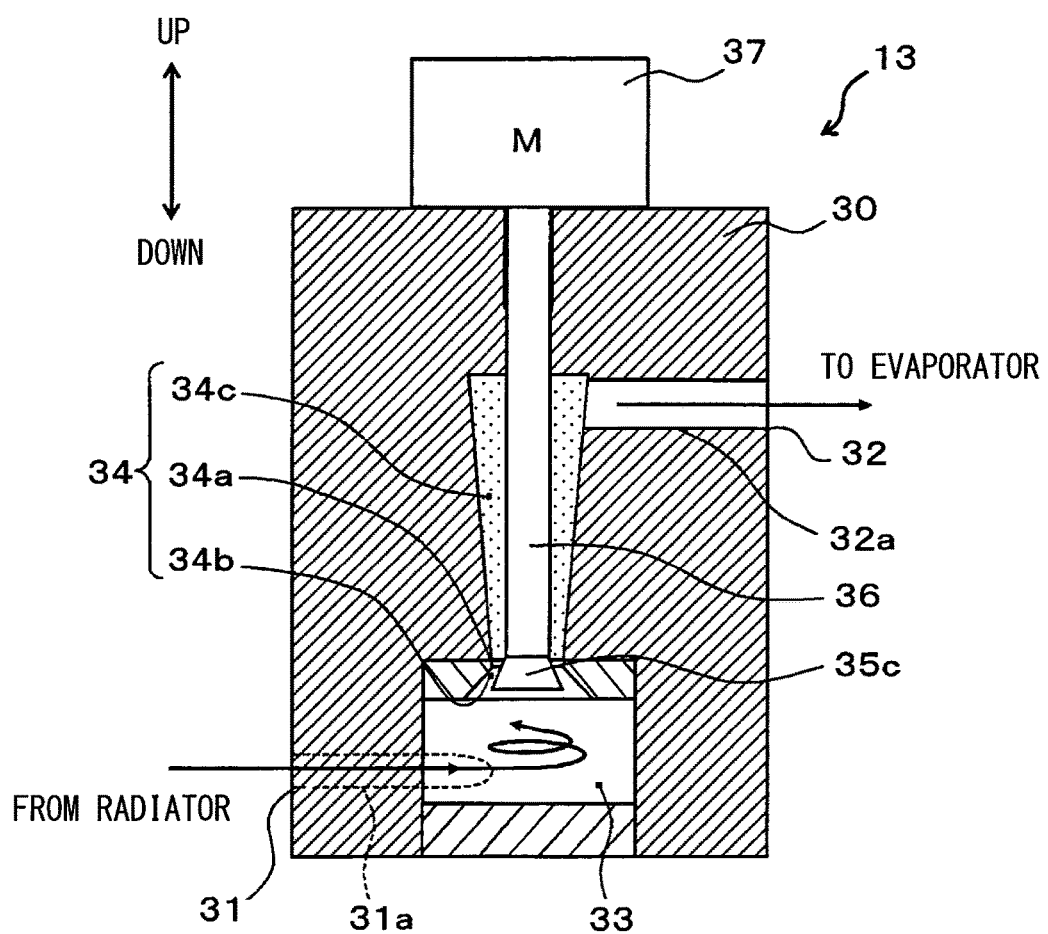
FIG. 13 is a schematic cross-sectional diagram of a decompression device, parallel to an axial direction thereof, according to a modification of the present disclosure.

For example, a circular truncated cone that tapers toward the downstream side in the refrigerant flow and a circular truncated cone that expands toward the downstream side in the refrigerant flow may be combined with each other as shown in FIG. 13. Further, a valve body 35c, which is formed in a circular truncated conical shape tapering toward the downstream side in the refrigerant flow as in the third embodiment, may be employed in this case.

(2) The structures described in the above-mentioned respective embodiments may be applied to other embodiments. For example, the plurality of refrigerant inlets 31 described in the fourth embodiment may be applied to the decompression device 13 described in the second, the third, and the sixth to eighth embodiments.

(3) Moreover, in the above-mentioned embodiments, the actuating bar 36 may be rotated in the same direction as the swirling direction of a refrigerant present in the swirling space 33 around the center axis. Here, since a refrigerant allowed to swirl in the swirling space 33 is made to flow into the refrigerant passage space 34 in the decompression device 13 of this embodiment, a velocity component corresponding to the swirling direction remains in the refrigerant flowing into the refrigerant passage space 34.

Accordingly, since a frictional force between the refrigerant flowing into the downstream-side space 34c and the actuating bar 36 can be reduced when the actuating bar 36 is rotated in the same direction as the swirling direction of a refrigerant, a gas-liquid multiphase low-pressure refrigerant depressurized in the throttle space 34b easily fills the downstream-side space 34c. Therefore, the pressure of a refrigerant, which is present in the inner space of the downstream-side space 34c, is easily uniformized.

As a result, the causes of noise generation, which is caused by the collision between liquid refrigerant and the wall surface of the refrigerant passage space 34 in the downstream-side space 34c, is easily reduced.

(4) Examples in which the valve body 35 is displaced so that the degree of superheating of a refrigerant present on the outlet side of the evaporator 14 approaches a predetermined given value have been described in the above-mentioned respective embodiments, but the displacement of the valve body 35 is not limited thereto. For example, the valve body 35 may be displaced so that the degree of subcooling of a refrigerant present on the outlet side of the heat radiator 12 approaches a predetermined given value.

(5) Examples in which the refrigeration cycle 10 including the decompression device 13 of this disclosure is applied to a vehicle air conditioning system have been described in the above-mentioned embodiments, but the application of the refrigeration cycle 10, which includes the decompression device 13 of this disclosure, is not limited thereto. For example, the refrigeration cycle 10 including the decompression device 13 of this disclosure may be applied to a floor-standing air conditioner, a cold/heat storage, a cooling/heating device for a vending machine, and the like.

(6) Examples in which a subcooling heat exchanger is employed as the heat radiator 12 have been described in the above-mentioned embodiments, but, needless to say, a normal heat radiator formed of only the condensing part 12a may be employed as the heat radiator 12.

What is claimed is:

1. A decompression device that is used for a vapor compression refrigeration cycle and depressurizes a refrigerant, the decompression device comprising:
a decompression device body part including at least one refrigerant inlet through which the refrigerant flows into the decompression device body part, a refrigerant outlet through which the refrigerant flows out of the decompression device body part, a swirling chamber in which the refrigerant flowing from the refrigerant inlet swirls, and a refrigerant passage space through which the refrigerant flows from the swirling chamber which is located upstream of the refrigerant passage space to the refrigerant outlet which is located downstream of the refrigerant passage space, wherein the swirling chamber has a circular shape in cross-section, and the refrigerant inlet extends to the swirling chamber in a tangential direction relative to the swirling chamber; and a valve body that varies a passage sectional area of the refrigerant passage space, wherein the refrigerant passage space includes;

a throttle space that is positioned on at least a part of an outer peripheral surface of the valve body and is a space in which the refrigerant flowing out of the swirling chamber is depressurized;

a wall surface defining a downstream-side space and extending straight from an upstream end of the downstream-side space to a downstream end of the downstream-side space, the upstream end of the downstream-side space being directly connected to a downstream side of the throttle space in a refrigerant flow direction; and a small passage area portion that is positioned on an upstream side of the throttle space in the refrigerant flow direction, the small passage area portion being smaller in passage sectional area than the throttle space and the downstream-side space, the valve body varies the passage sectional area of the small passage area portion, and the downstream-side space has an annular shape configured to uniformly depressurize the refrigerant flowing into the downstream-side space during the operation of the refrigeration cycle, and wherein the refrigerant outlet includes a refrigerant outflow passage directly connected to the wall surface of the downstream-side space, the refrigerant outflow passage extending at an angle with a center axis of the downstream-side space and communicating with the refrigerant outlet, a connection end of the refrigerant outflow passage directly connected to the wall surface of the downstream-side space includes a shortest point which is the shortest among the connection end in distance to the upstream end of the downstream-side space, the shortest point is separated by a predetermined gap from the upstream end of the downstream-side space, and the predetermined gap is larger than the diameter of the connection end of the refrigerant outflow passage and the outer diameter of the downstream-side space.

2. The decompression device according to claim 1, wherein an outer shape of the downstream-side space is cylindrical.

3. The decompression device according to claim 1, wherein an outer shape of the downstream-side space is truncated conical to gradually increase in passage sectional area toward a downstream side in the refrigerant flow direction.

4. The decompression device according to claim 1, further comprising an actuating bar that displaces the valve body, wherein the actuating bar is disposed in the refrigerant passage space and has a shape extending coaxially with a center axis of the refrigerant passage space.

5. The decompression device according to claim 4, wherein the actuating bar is rotatable about the center axis of the refrigerant passage space.

6. The decompression device according to claim 1, wherein the valve body includes a first portion, and a second portion that is positioned on a downstream side of the first portion in the refrigerant flow direction and is larger in outer diameter than the first portion, and the second portion of the valve body is displaced on a downstream side of the small passage area portion in the refrigerant flow direction.

7. The decompression device according to claim 1, wherein a passage sectional area of the throttle space gradually increases downstream in the refrigerant flow direction.

8. The decompression device according to claim 1, wherein a number of the refrigerant inlets is plural, and a plurality of refrigerant inlets are disposed symmetrically with respect to a center axis of the swirling chamber.

9. The decompression device according to claim 1, further comprising a swirling-flow-rate adjusting device that adjusts a flow rate of the refrigerant swirling in the swirling chamber.

10. The decompression device according to claim 9, wherein the swirling-flow-rate adjusting device is an inflow refrigerant-flow rate adjusting valve that adjusts the flow rate of the refrigerant flowing into the swirling chamber from the refrigerant inlet.

11. The decompression device according to claim 1, wherein the refrigerant passage space has a circular shape in cross-section, and a center axis of the swirling chamber and a center axis of the refrigerant passage space are disposed coaxially with each other.

12. The decompression device according to claim 1, wherein the refrigerant outflow passage is directly connected to the downstream end of the downstream-side space.

13. The decompression device according to claim 1, wherein the wall surface is straight in a cross-sectional plane parallel to the center axis of the downstream-side space.

14. The decompression device according to claim 1, wherein the downstream-side space has a circular cylindrical shape, and an entire circumferential side of the downstream-side space is defined by the wall surface.

15. The decompression device according to claim 1, wherein the swirling chamber, the small passage area portion, the throttle space and the downstream-side space are coaxial with respect to the center axis of the downstream-side space, and the small passage area portion is directly connected to both the swirling chamber and the throttle space.

16. The decompression device according to claim 1, wherein an end of the valve body facing the swirling chamber is tapered toward the swirling chamber.

17. A decompression device used during a vapor compression refrigeration cycle to depressurize a refrigerant, the decompression device comprising:

a decompression device body part having a longitudinal axis and extending longitudinally from an upstream end to a downstream end, wherein the decompression device body part includes at least one refrigerant inlet through which the refrigerant flows into the decompression device body part, a swirling chamber in which the refrigerant flowing from the refrigerant inlet swirls, a refrigerant passage space through which the refrigerant flows from the swirling chamber, and at least one refrigerant outlet through which the refrigerant flows out of the decompression device body part, wherein each of the swirling chamber and the refrigerant passage space include a longitudinal axis running longitudinally with, and coaxial to, the longitudinal axis of the decompression device body part, and wherein the swirling chamber is downstream from the at least one refrigerant inlet in a direction of refrigerant flow, and wherein the refrigerant passage space is downstream of the swirling chamber in the direction of refrigerant flow and in direct connection to the swirling chamber, and wherein the at least one refrigerant outlet is downstream of the refrigerant passage in the direction of refrigerant flow; and a valve body configured to actuate between a closed position and an open position, such that the valve body is configured to vary a width of the refrigerant passage space when actuated between the closed position and the open position, wherein the refrigerant passage space includes a throttle space that is positioned on at least a part of an outer peripheral surface of the valve body and is a space configured to depressurize the refrigerant flowing out of the swirling chamber, an annular-shaped downstream-side space having walls that extend longitudinally from an upstream end of the downstream-side space to a downstream end of the downstream-side space, and a small passage having a width smaller than a width of the throttle space and a width of the downstream-side space, wherein the throttle space is upstream of the downstream-side space in the direction of refrigerant flow, and wherein the valve body varies the width of the small passage when actuated between the closed position and the open position, and wherein the annular shape of the downstream-side space is configured to uniformly depressurize the refrigerant flowing into the downstream-side space such that a pressure of the refrigerant within the downstream-side space is uniform, a connection end of the refrigerant outflow passage directly connected to the walls of the downstream-side space includes a shortest point which is the shortest among the connection end in distance to the upstream end of the downstream-side space, the shortest point is separated by a predetermined gap from the upstream end of the downstream-side space, and the predetermined gap is larger than the diameter of the connection end of the refrigerant outflow passage and the outer diameter of the downstream-side space.

18. The decompression device according to claim 17, wherein the decompression device body part includes at least one refrigerant inflow passage in direct connection to the at least one refrigerant inlet and the swirling chamber, and wherein the swirling chamber includes an inner wall, and wherein the at least one refrigerant inflow passage extends tangential to the inner wall of the swirling chamber and nonparallel to the longitudinal axis of the swirling chamber.

19. The decompression device according to claim 17, wherein the decompression device body part includes at least one refrigerant outflow passage in direct connection to the at least one refrigerant outlet and the downstream-side space, and wherein the walls of the downstream-side space include an inner wall and an outer wall, and wherein the at least one refrigerant outflow passage extends perpendicular to the outer wall of the downstream-side space and nonparallel to the longitudinal axis of the downstream-side space.

20. The decompression device according to claim 19, wherein the outer wall of the downstream-side space is cylindrically shaped.

21. The decompression device according to claim 19, wherein the outer wall of the downstream-side space is frusto-conical shaped which gradually increases in width as the downstream-side space extends downstream in the refrigerant flow direction.

22. The decompression device according to claim 17, further comprising a swirling-flow-rate adjusting device configured to adjust a flow rate of the refrigerant swirling in the swirling chamber.

23. A decompression device that is used for a vapor compression refrigeration cycle and depressurizes a refrigerant, the decompression device comprising:

a decompression device body part including at least one refrigerant inlet through which the refrigerant flows into the decompression device body part, a refrigerant outlet through which the refrigerant flows out of the decompression device body part, a swirling chamber in which the refrigerant flowing from the refrigerant inlet swirls, and a refrigerant passage space that guides through which the refrigerant flowing out of flows from the swirling chamber which is located upstream of the refrigerant passage space to the refrigerant outlet which is located downstream of the refrigerant passage space, wherein the swirling chamber has a circular shape in cross-section, and the refrigerant inlet extends to the swirling chamber in a tangential direction of the swirling chamber; and a valve body that varies a passage sectional area of the refrigerant passage space, wherein the refrigerant passage space includes;

a throttle space that is positioned on at least a part of an outer peripheral surface of the valve body and is a space in which the refrigerant flowing out of the swirling chamber is depressurized;

a wall surface defining a downstream-side space and extending straight from an upstream end of the downstream-side space to a downstream end of the downstream-side space, the upstream end of the downstream-side space being directly connected to a downstream side of the throttle space in a refrigerant flow direction; and a smallest passage area portion that is positioned on an upstream side of the throttle space in the refrigerant flow direction, the smallest passage area portion being smaller in passage sectional area than the throttle space and the downstream-side space, the valve body varies the passage sectional area of the smallest passage area portion, the downstream-side space has an annular shape configured to uniformly depressurize the refrigerant flowing into the downstream-side space during the operation of the refrigeration cycle, the refrigerant outlet includes a refrigerant outflow passage directly connected to the wall surface of the downstream-side space, the refrigerant outflow passage extending at an angle with a center axis of the downstream-side space and communicating with the refrigerant outlet, the swirling chamber, the smallest passage area portion, the throttle space and the downstream-side space are coaxial with respect to the center axis of the downstream-side space, and the smallest passage area portion is directly connected to both the swirling chamber and the throttle space.

24. The decompression device according to claim 23, wherein an end of the valve body facing the swirling chamber is tapered toward the swirling chamber.

* * * * *